United States Patent
Park et al.

(10) Patent No.: US 8,233,731 B2
(45) Date of Patent: Jul. 31, 2012

(54) METHOD AND APPARATUS TO ENCODE AND DECODE HALFTONE IMAGE

(75) Inventors: Sung-bum Park, Seongnam-si (KR);
Woo-sung Shim, Suwon-si (KR);
Young-ho Moon, Suwon-si (KR);
Dai-woong Choi, Seoul (KR);
Jong-bum Choi, Yangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1045 days.

(21) Appl. No.: 12/170,875

(22) Filed: Jul. 10, 2008

(65) Prior Publication Data

US 2009/0169123 A1 Jul. 2, 2009

Related U.S. Application Data

(60) Provisional application No. 61/017,221, filed on Dec. 28, 2007.

(30) Foreign Application Priority Data

Feb. 11, 2008 (KR) .................. 10-2008-0012209

(51) Int. Cl.
*H06K 9/46* (2006.01)

(52) U.S. Cl. ..................... 382/238; 382/239

(58) Field of Classification Search ............. 382/238, 382/239
See application file for complete search history.

(56) References Cited

U.S. PATENT DOCUMENTS

| | | | | |
|---|---|---|---|---|
| 5,297,220 A | * | 3/1994 | Nomizu | 382/247 |
| 5,731,988 A | * | 3/1998 | Zandi et al. | 382/167 |
| 5,734,753 A | | 3/1998 | Bunce | |
| 5,857,035 A | * | 1/1999 | Rust | 382/247 |
| 5,901,251 A | * | 5/1999 | Rust | 382/247 |
| 5,903,676 A | * | 5/1999 | Wu et al. | 382/244 |
| 6,526,172 B1 | | 2/2003 | Arai | |
| 6,792,150 B1 | * | 9/2004 | Satoh | 382/238 |
| 2002/0051488 A1 | * | 5/2002 | Li | 375/240 |
| 2003/0138151 A1 | * | 7/2003 | Schwartz | 382/239 |
| 2003/0197878 A1 | | 10/2003 | Metois | |
| 2003/0202708 A1 | | 10/2003 | Renshaw et al. | |
| 2005/0238245 A1 | * | 10/2005 | Yao et al. | 382/244 |
| 2009/0169123 A1 | * | 7/2009 | Park et al. | 382/243 |

FOREIGN PATENT DOCUMENTS

JP 8-30794 2/1996

(Continued)

OTHER PUBLICATIONS

"An Algorithm for Compression of Bilevel Images," Maire D. Reavy et al, IEEE Transactions on Image Processing, vol. 10, No. 5, May 2001 669-678.*

(Continued)

*Primary Examiner* — Wenpeng Chen
(74) *Attorney, Agent, or Firm* — Stanzione & Kim, LLP (57) ABSTRACT

A method to encode and decode a halftone image such that the halftone image is efficiently compressed and decoded by using pattern characteristics of the halftone image includes determining different template shapes according to characteristics of the halftone image, compressing the halftone image based on determined template shape information, compressing the template shape information, and generating the compressed halftone image and the compressed template shape information as a bitstream.

20 Claims, 10 Drawing Sheets

FOREIGN PATENT DOCUMENTS

JP   2003-179761   6/2003

OTHER PUBLICATIONS

"Tree Coding of Bilevel Images," Bo Martins et al, IEEE Transactions on Image Processing, vol. 7, No. 4, Apr. 1998 517-528.*
"On-Line Compression of High Precision Printer Images by Evolvable Hardware," M. Salami et al, Proceedings of Data Compression Conference, 1998. DCC '98, Mar. 30-Apr. 1, 1998, pp. 219-228.*
International Search Report issued Feb. 5, 2009 in International Application No. PCT/KR2008/004608.
European Search Report issued Jun. 22, 2011 in EP Application No. 08793122.6.
European Examination Report issued Aug. 29, 2011 in EP Application No. 08793122.6.
Denecker K. et al: "Context-Based Lossless Halftone Image Compression", Journal of Electronics Imaging, Spie/IS & T, vol. 8, No. 4, Oct. 1, 1999 pp. 404-414, XP000875032, ISSN: 1017-9909, DOI: DOI:10.1117/1.482708 *the whole document*.
Sakanashi H et al. "Evolvable hardware chips and their application", Systems, Man, and Cybernetics, 1999. IEEE SMC '99 Conference Proceedings. 1999 IEEE International Conference on Tokyo, Japan Oct. 12-15, 1999, Piscataway, NJ, USA, IEEE, US, vol. 5, Oct. 12, 1999, pp. 559-564, XP010362863 ISBN: 978-0-7803-5731-0 *Sections "Electrophotographic Printing", EHW for Data Compression and "EHW Chip for Data Compression".; p. 560-563*.
Park S-B et al.: "Lossless compression of 1-15 color halftone images using color channel adaptive templates", The 23rd International Technical Conference on Circuits/Systems, Computer and Communications (ITC-CSCC 2008), Jul. 6, 2008 (Jul. 9, 2008), XP002636436, *the whole document*.
Chinese Office Action Issued on Feb. 28, 2012 in CN Patent Application No. 200880123080.2.

* cited by examiner

| Data | Size | Original data size | JBIG (A) | Proposed (B) | Bit saving (1−B/A) |
|---|---|---|---|---|---|
| Airplane | 512×512 | 131,072 | 33,369 | 18,324 | 45.09% |
| Baboon | 512×512 | 131,072 | 50,605 | 39,737 | 21.48% |
| House2 | 512×512 | 131,072 | 38,998 | 25,582 | 34.40% |
| Lena | 512×512 | 131,072 | 40,260 | 24,789 | 38.43% |
| Peppers | 512×512 | 131,072 | 38,775 | 26,997 | 30.38% |
| Tiffany | 512×512 | 131,072 | 28,322 | 13,492 | 52.36% |
| Text | 4800×6800 | 16,320,000 | 1,288,795 | 928,325 | 27.97% |
| Graphic | 4800×6800 | 16,320,000 | 1,695,255 | 773,388 | 54.38% |
| Image | 4800×6800 | 16,320,000 | 3,943,299 | 2,036,508 | 48.36% |
| Mixed | 4800×6800 | 16,320,000 | 2,465,194 | 1,785,432 | 27.57% |
| Total | | | 9,622,872 | 5,672,574 | 41.05% |

METHOD AND APPARATUS TO ENCODE AND DECODE HALFTONE IMAGE

CROSS-REFERENCE TO RELATED APPLICATIONS

This application claims the benefit of U.S. Provisional Patent Application No. 61/017,221, filed on Dec. 28, 2007, in the U.S. Patents and Trademark Office, and claims priority under 35 U.S.C. §119(a) from Korean Patent Application No. 10-2008-0012209, filed on Feb. 11, 2008, in the Korean Intellectual Property Office, the disclosures of which are incorporated herein in their entirety by reference.

BACKGROUND OF THE INVENTION

1. Field of the Invention

The present general inventive concept generally relates to an image coder-decoder (CODEC), and more particularly, to a method and apparatus to encode and decode a halftone image such that the halftone image is efficiently compressed and decoded by using pattern characteristics of the halftone image.

2. Description of the Related Art

Generally, an image output apparatus such as a digital printer or a duplicator substantially conveys various color impressions with only two colors, white and black. For example, a digital color printer expresses a color image displayed on a monitor with only two values of black and white. In order to output color images of various brightnesses displayed on the monitor through the color printer, the color printer or a personal computer (PC) performs a procedure for converting an input image into a binary image. That is, the color printer or the PC performs a process of converting the input image of pixels into an image having a gray scale between 0 and 255 and a process of converting the image having the gray scale into the binary image. The image having the gray scale between 0 and 255 is referred to as a gray-scale image and the process of converting the gray-scale image into the binary image is called half-toning.

Generally, in order to reduce an amount and speed of data transmission, a host device compresses binary image data that has undergone half-toning by using a compression scheme such as joint bi-level image experts group (JBIG) or JBIG2 and then transmits the compressed binary image data to an image forming apparatus. The image forming apparatus decodes the compressed binary image data and then performs a printing task.

In JBIG established as a standard for binary image compression, a halftone compression scheme involves setting a template for predicting a probability of a pixel and performing binary arithmetic encoding by using the template. Herein, the template refers to a position pattern of a reference pixel.

However, according to a conventional binary image compression scheme, binary arithmetic encoding is performed by using identical template information for color channels, resulting in low compression rate.

SUMMARY OF THE INVENTION

The present general inventive concept provides a method of encoding and decoding a halftone image such that the halftone image can be efficiently compressed and decoded without loss by selecting a template that is adaptive to pattern characteristics of the halftone image.

The present general inventive concept also provides an apparatus to encode and decode a halftone image to which the method of encoding and decoding the halftone image is applied.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a method of encoding a halftone image. The method includes determining a plurality of different template shapes according to characteristics of the halftone image, compressing the halftone image based on determined template shape information, compressing the template shape information, and generating the compressed halftone image and the compressed template shape information as a bitstream.

The foregoing and/or other aspects and utilities of the general inventive concept may also be achieved by providing a method of decoding a halftone image. The method includes splitting a bitstream into a halftone image bitstream and a template bitstream, decoding template shape information generated according to characteristics of the halftone image from the template bitstream, and decoding the halftone image based on the decoded template shape information.

The foregoing and/or other aspects and utilities of the general inventive concept may also be achieved by providing an apparatus to encode a halftone image. The apparatus includes a template information encoding unit to determine a plurality of different template shapes according to characteristics of the halftone image and to compress determined template shape information, a first context modeling unit to extract a context for pixels of the halftone image based on the template shape information determined by the template information encoding unit, an arithmetic encoding unit to compress the halftone image based on the context extracted by the first context modeling unit, and a bitstream generation unit to generate the template shape information compressed by the template information encoding unit and the halftone image compressed by the arithmetic encoding unit as a bitstream.

The foregoing and/or other aspects and utilities of the general inventive concept may also be achieved by providing an apparatus to decode a halftone image. The apparatus includes a bitstream splitting unit to split a bitstream into a halftone image bitstream and a template bitstream, a template information decoding unit to decode template shape information generated according to characteristics of the halftone image from the template bitstream obtained by the bitstream splitting unit, a second context modeling unit to extract a context for pixels of the halftone image based on the template shape information decoded by the template information decoding unit and previous pixel information, and an arithmetic decoding unit to decode the halftone image based on the context extracted by the second context modeling unit.

The foregoing and/or other aspects and utilities of the general inventive concept may also be achieved by providing a halftone image coding-decoding (CODEC) method including determining a plurality of different template shapes according to characteristics of the halftone image and compressing determined template shape information, compressing the halftone image based on the determined template shape, generating the compressed halftone image and the compressed template shape information as a bitstream, extracting a halftone image bitstream and a template bitstream from the bitstream, decoding the template shape information from the extracted template bitstream, and decoding the compressed halftone image based on the decoded template shape information.

The foregoing and/or other aspects and utilities of the general inventive concept may also be achieved by providing a halftone image encoder apparatus, the apparatus including a template information encoding unit to determine different template shapes, and to compress a halftone image based on the determined template shape information, wherein the different template shapes are determined based on characteristics of the halftone image.

The foregoing and/or other aspects and utilities of the general inventive concept may also be achieved by providing a halftone image coding and decoding system, the system including an encoding unit to the determine different template shapes corresponding to characteristics of a halftone image and to compress determined template shape information, to compress the halftone image based on the determined template shape, and to generate the compressed halftone image and the compressed template shape information as a bitstream, and a decoding unit to extract a halftone image bitstream and a template bitstream from the bitstream, to decode the template shape information from the extracted template bitstream, and to decode the compressed halftone image based on the decoded template shape information.

The foregoing and/or other aspects and utilities of the general inventive concept may also be achieved by providing a method of encoding a halftone image, the method including determining different template shapes based on characteristics of the halftone image, and compressing the halftone image based on determined template shape information.

The foregoing and/or other aspects and utilities of the general inventive concept may also be achieved by providing a computer-readable recording medium having embodied thereon a computer program to execute a method, wherein the method including determining different template shapes determined based on characteristics of the halftone image, and compressing the halftone image based on determined template shape information.

BRIEF DESCRIPTION OF THE DRAWINGS

The above and other features and utilities of the present general inventive concept will become more apparent by describing in detail embodiments thereof with reference to the attached drawings in which.

DETAILED DESCRIPTION OF THE PREFERRED EMBODIMENTS

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
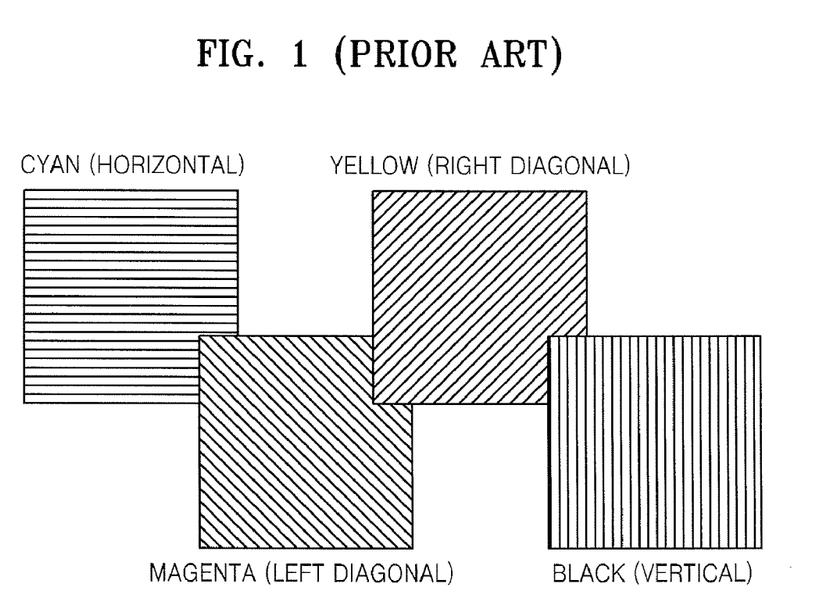
FIG. 1 illustrates characteristics of a general color halftone image.

FIG. 1 illustrates characteristics of a general color halftone image.

The color halftone image is composed of different line patterns for different color channels.

As illustrated in FIG. 1, a cyan magenta yellow black (CMYK) image is composed of a cyan channel, a magenta channel, a yellow channel, and a black channel. An image of the cyan channel has a horizontal line pattern characteristic, an image of the magenta channel has a left diagonal line pattern characteristic, an image of the yellow channel has a right diagonal line pattern characteristic, and an image of the black channel has a vertical line pattern characteristic. An image line pattern indicates correlation between pixels.

Figure 2:
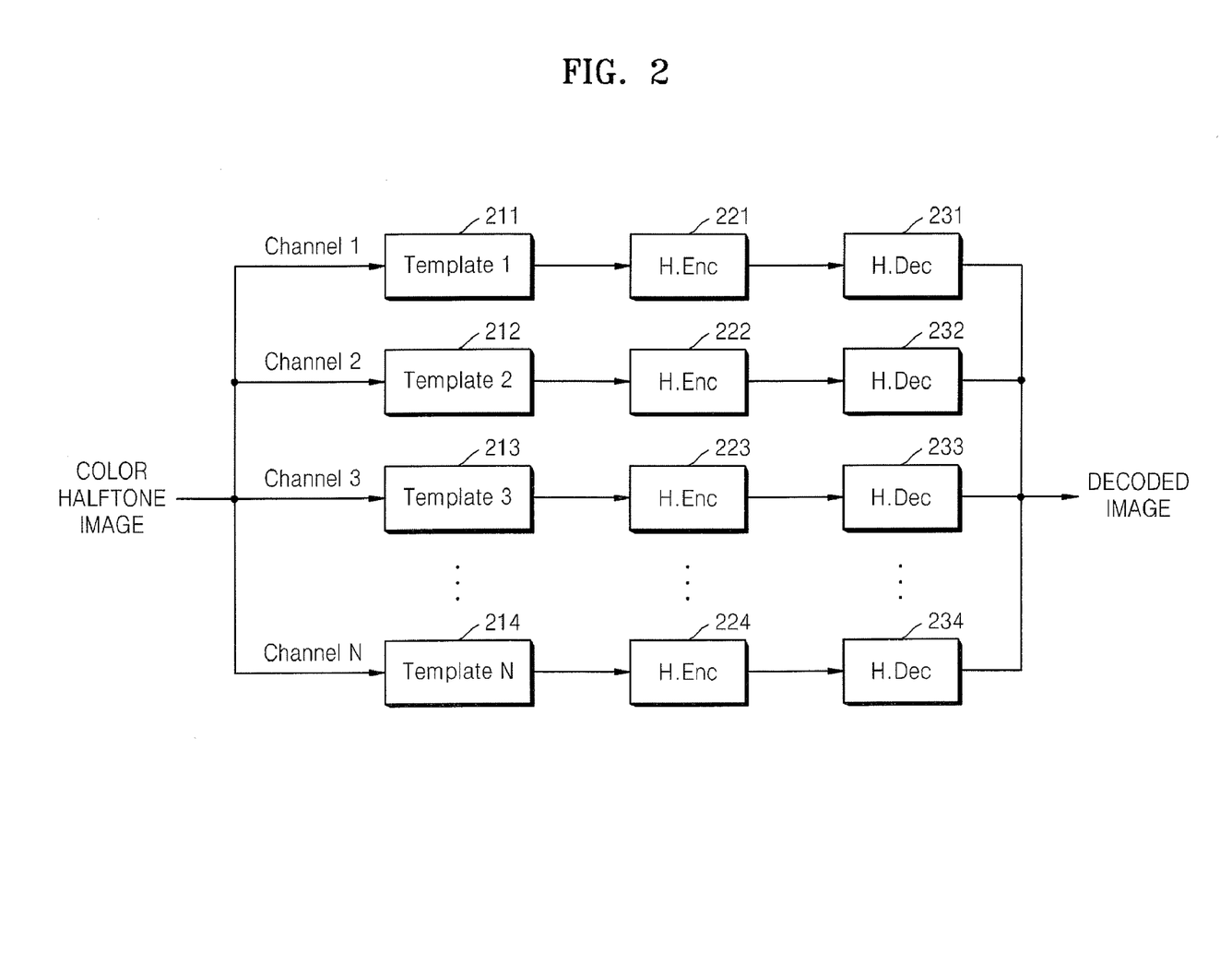
FIG. 2 is an entire conceptual diagram where different templates are applied to N color channels of a halftone image according to an embodiment of the present general inventive concept.

FIG. 2 is an entire conceptual diagram where different templates are applied to N color channels of a halftone image according to an embodiment of the present general inventive concept.

Referring to FIG. 2, different optimal templates are preset for images of the N color channels.

Halftone encoding 221 and halftone decoding 231 are performed on a halftone image of a first color channel by using a first template 211.

Halftone encoding 222 and halftone decoding 232 are performed on a halftone image of a second color channel by using a second template 212.

Halftone encoding 223 and halftone decoding 233 are performed on a halftone image of a third color channel by using a third template 213.

Halftone encoding 224 and halftone decoding 234 are performed on a halftone image of an $n^{th}$ color channel by using an $n^{th}$ template 214.

Figure 3A:
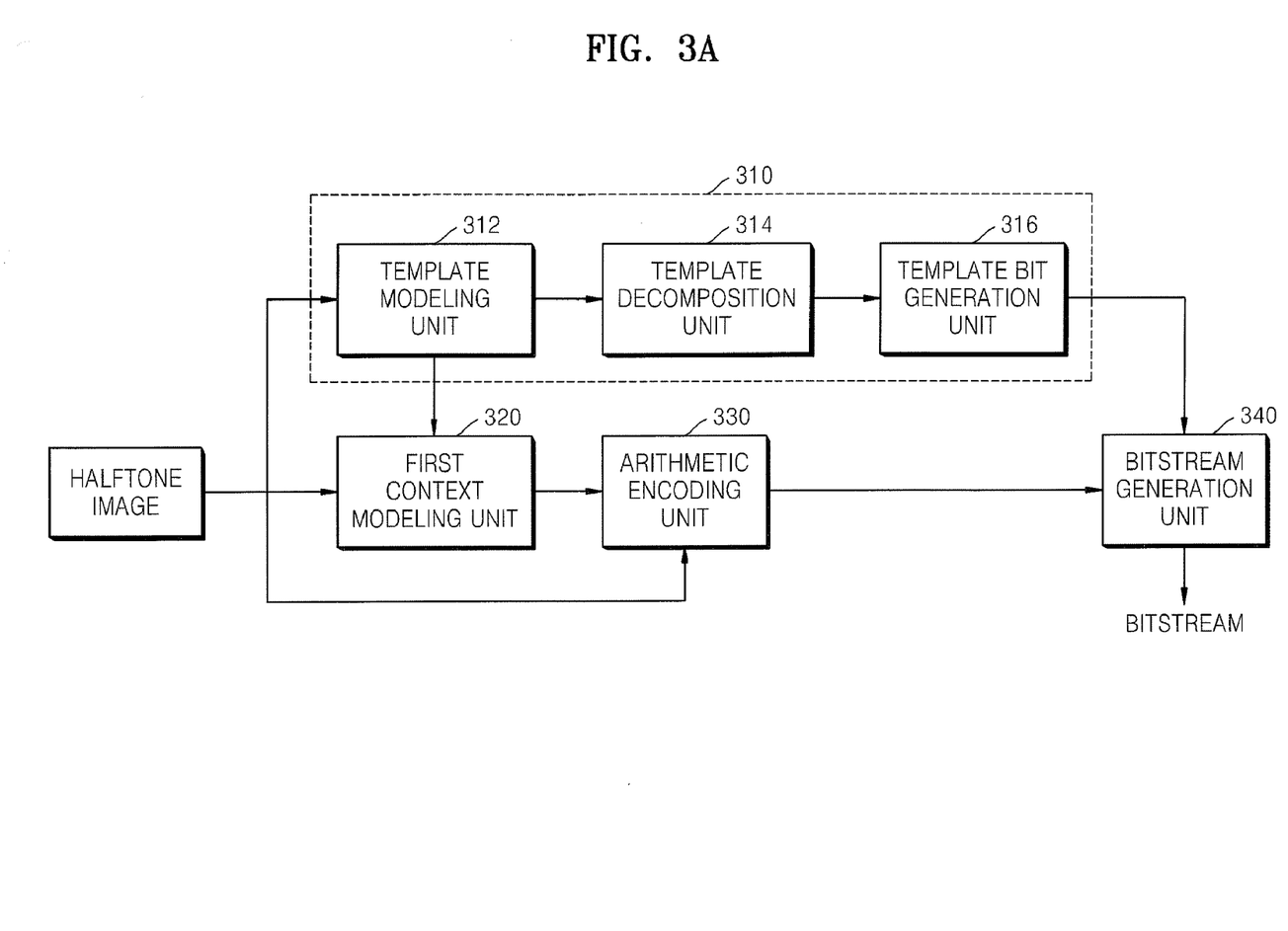
FIG. 3A is a block diagram illustrating an apparatus to encode a halftone image according to an embodiment of the present general inventive concept.

FIG. 3A is a block diagram illustrating an apparatus to encode a halftone image according to an embodiment of the present general inventive concept.

Referring to FIG. 3A, the apparatus includes a template information encoding unit 310, a first context modeling unit 320, an arithmetic encoding unit 330, and a bitstream generation unit 340.

The template information encoding unit 310 determines different template shapes according to the characteristics of the halftone image and encodes template shape information.

The template information encoding unit 310 includes a template modeling unit 312, a template decomposition unit 314, and a template bit generation unit 316.

The template modeling unit 312 detects the characteristics of an input halftone image, e.g., a line pattern for each color channel of the halftone image, and determines different template shapes which are preset for color channels of the halftone image. Typically, different line patterns are generated for different color channels of the halftone image. Herein, a template refers to position pattern information of a reference pixel. Information about a template that is designed optimally for a line pattern of each color channel is stored in a memory. Channel characteristics of the halftone image may be detected by using various well-known techniques. For example, in order to extract a line pattern from the halftone image, an image domain is divided into sub images. A line segment traversing the center of each sub image is extracted from each sub image. Next, each pixel of the extracted line segment is accumulated in a bin called a cumulative matrix. The line pattern is extracted by using the cumulative matrix.

For template modeling, for example, a halftone image having CMYK channels is input. The CMYK halftone image is composed of the cyan channel, the magenta channel, the yellow channel, and the black channel as illustrated in FIG. 2. Thus, the template modeling unit 312 loads different shapes of a template which are preset for the cyan channel, the magenta channel, the yellow channel, and the black channel in a memory.

The template decomposition unit 314 extracts relative position information between pixels constituting a template shape determined by the template modeling unit 312 and generates the relative position information as a symbol to be coded (or a coding symbol)

The template bit generation unit 316 converts the symbol generated by the template decomposition unit 314 into bits.

The first context modeling unit 320 models a pattern of values of reference pixels of the halftone image by using the template shape information. That is, the first context modeling unit 320 extracts a context for pixels of an input halftone image by using the template shape information determined by the template modeling unit 312 in order to determine a probability of a pixel value of the halftone image having "0" and a probability of a pixel value of the halftone image having "1". Herein, the context refers to a vector enumerated by extracting a value of each pixel located in a position designated by the template. For example, when there are reference pixels "P1"-"P9" and a coding pixel "x", <100000000> obtained by enumerating values of pixels corresponding to the reference pixels "P1"-"P9" is the context.

The arithmetic encoding unit 330 compresses the halftone image by calculating a prediction value for a current pixel according to the context extracted by the first context modeling unit 320. The arithmetic encoding unit 330 is known to compress data by using a compression scheme such as the JBIG standard and thus will not be described in detail.

The bitstream generation unit 340 generates template bits generated by the template bit generation unit 316 and halftone image bits compressed by the arithmetic encoding unit 330 as a bitstream.

Figure 3B:
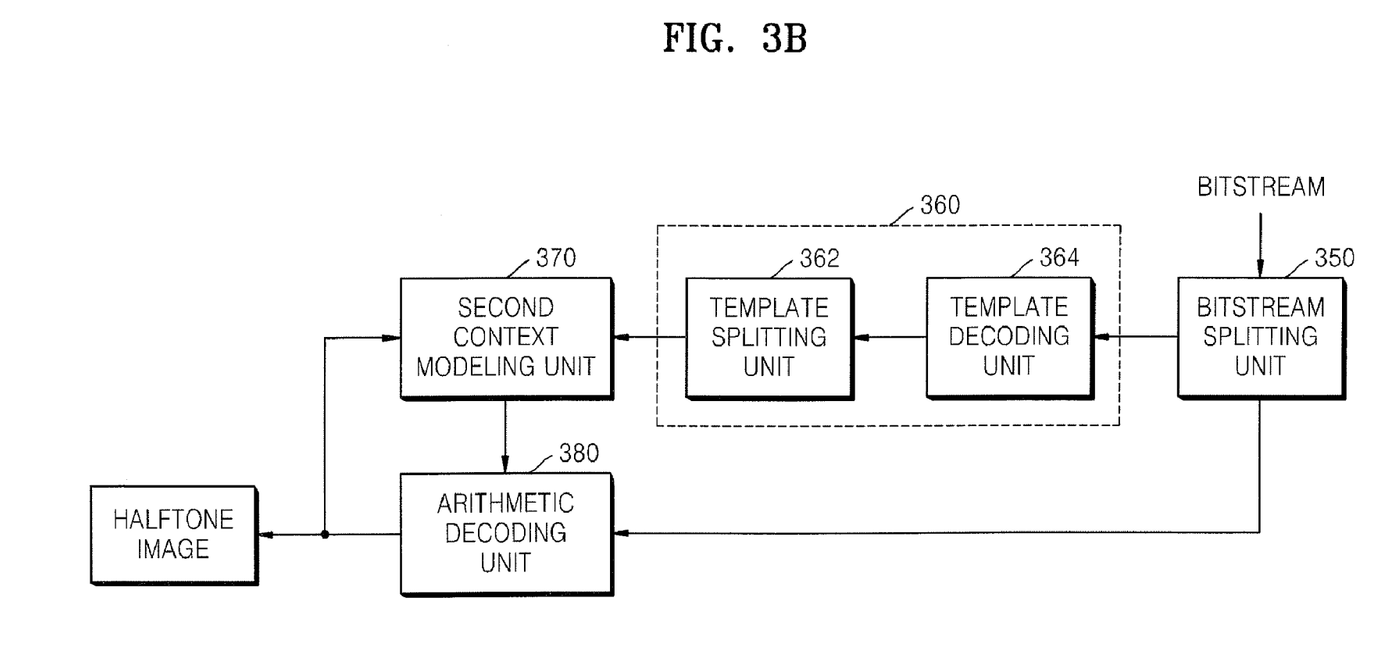
FIG. 3B is a block diagram illustrating an apparatus to decode a halftone image according to an embodiment of the present general inventive concept.

FIG. 3B is a block diagram illustrating an apparatus to decode a halftone image according to an embodiment of the present general inventive concept.

Referring to FIG. 3B, the apparatus includes a bitstream splitting unit 350, a template information decoding unit 360, a second context modeling unit 370, and an arithmetic decoding unit 380.

The bitstream splitting unit 350 splits an input bitstream into a halftone image bitstream and a template bitstream.

The template information decoding unit 360 decodes template shape information from the template bitstream obtained by the bitstream splitting unit 350.

The template information decoding unit 360 includes a template bit decoding unit 364 and a template decoding unit 362.

The template bit decoding unit 364 decodes partial template symbols from the template bitstream.

The template decoding unit 362 decodes a template shape by recombining the partial template symbols decoded by the template bit decoding unit 364.

The second context modeling unit 370 extracts a context for a pixel of the halftone image by using the template shape decoded by the template decoding unit 362 and a previous pixel value.

The arithmetic decoding unit 380 decodes the halftone image according to the context extracted by the second context modeling unit 370. The arithmetic decoding unit 380 is well known in a standard such as JBIG and thus will not be described in detail.

FIGS. 4A through 4D illustrate templates having shapes designed different for images of channels according to an embodiment of the present general inventive concept.

As illustrated in FIGS. 4A through 4D, different template shapes are set according to characteristics of a halftone image. A size of each template is fixed to 10 pixels in order to maintain compatibility with the existing JBIG standard. Herein, "0"-"9" indicate the positions of reference pixels and "x" indicates the position of a current coding pixel.

Figure 4A:
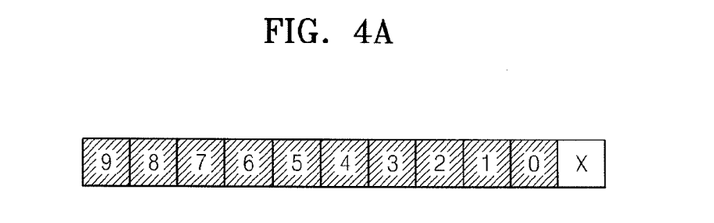
FIGS. 4A through 4D illustrate templates having shapes designed different for images of channels according to an embodiment of the present general inventive concept.
Figure 4B:
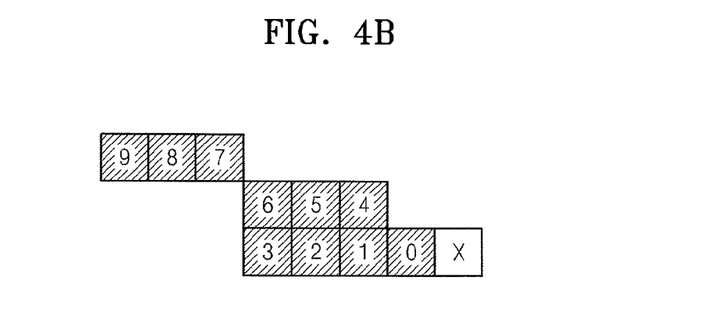
Figure 4C:
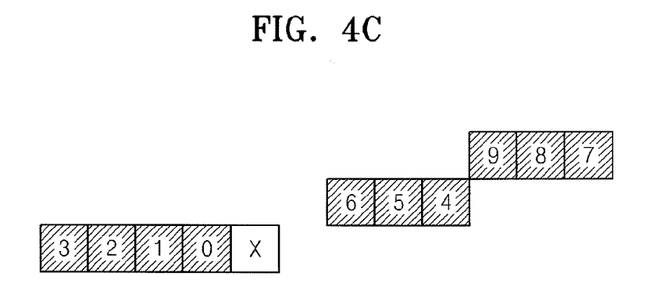
Figure 4D:
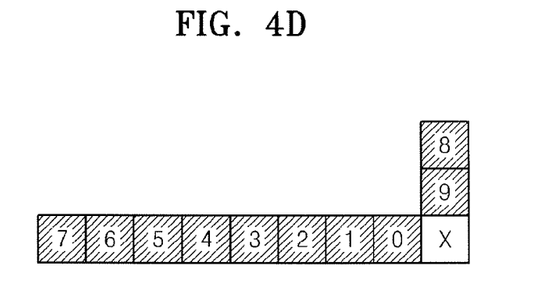

For example, a first template shape illustrated in FIG. 4A is set for an image of a cyan channel, a second template shape illustrated in FIG. 4B is set for an image of a magenta channel, a third template shape illustrated in FIG. 4C is set for an image of a yellow channel, and a fourth template shape illustrated in FIG. 4D is set for an image of a black channel. At this time, a template shape for each channel is previously determined according to experimental values and stored in a table or is generated by predetermined template software.

Figure 5:
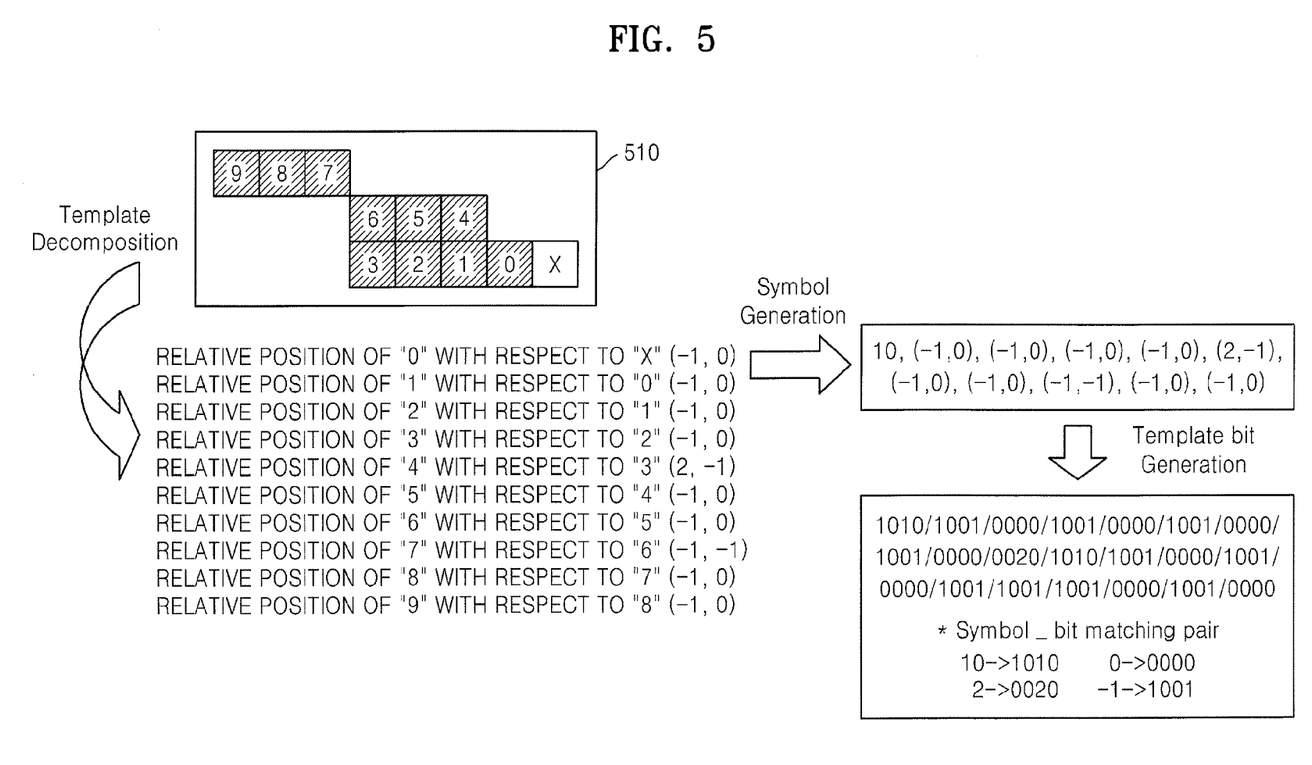
FIG. 5 is a diagram illustrating template decomposition performed by a template decomposition unit illustrated in FIG. 3A and template bit generation performed by a template bit generation unit illustrated in FIG. 3A according to an embodiment of the present general inventive concept.

FIG. 5 is a diagram illustrating template decomposition performed by the template decomposition unit 314 illustrated in FIG. 3A and template bit generation performed by the template bit generation unit 316 illustrated in FIG. 3A according to an embodiment of the present general inventive concept.

As illustrated in FIG. 5, template shape information 510 defines a number N of reference pixels constituting a template shape and the positions (x, y) of the reference pixels. In the template shape information 510, "0"-"9" indicate the reference pixels and "x" indicates a coding pixel.

Relative position information between pixels is extracted from the template shape information 510 of the magenta channel in which the number N of reference pixels is 10. That is, a difference between the position of a $p^{th}$ template pixel and the position of a $(p+1)^{th}$ template pixel is extracted from a template. For example, the relative position of a pixel "0" with respect to the coding pixel "x" is indicated as "(−1, 0)". The relative position of a pixel "1" with respect to the pixel "0" is indicated as "(−1, 0)". The relative position of a pixel "2" with respect to the pixel "1" is indicated as "(−1, 0)". The relative position of a pixel "3" with respect to the pixel "2" is indicated as "(−1, 0)". The relative position of a pixel "4" with respect to the pixel "3" is indicated as "(2, −1)". The relative position of a pixel "5" with respect to the pixel "4" is indicated as "(−1, 0)". The relative position of a pixel "6" with respect to the pixel "5" is indicated by "(−1, 0)". The relative position of a pixel "7" with respect to the pixel "6" is indicated as "(−1, −1)". The relative position of a pixel "8" with respect to the pixel "7" is indicated as "(−1, 0)". The relative position of a pixel "9" with respect to the pixel "8" is indicated as "(−1, 0)".

Next, the decomposed relative position information between pixels may be expressed as a coding symbol.

For example, the number of pixels and relative position information between pixels may be indicated as "10, [−1, 0], [−1, 0], [−1, 0], [−1, 0], [2, −1], [−1, 0], [−1, 0], [−1, −1], [−1, 0], [−1, 0]".

Next, the coding symbol is generated as bits by using a bit matching pair.

For example, if a symbol-bit matching pair is set to "10–>1010", "0–>0000", "2–>0020", and "−1–>1001", the number of pixels and relative position information between pixels may be indicated as "1010/1001/0000/1001/0000/1001/0000/1001/0000/0020/1010/1001/0000/1001/0000/1001/100 1/1001/0000/1001/0000".

Figure 6:
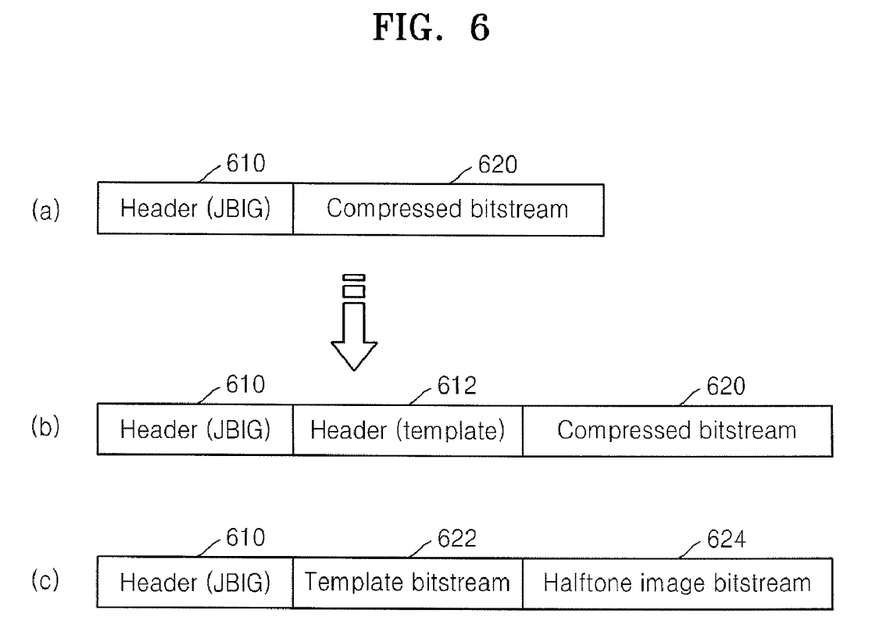
FIG. 6 is a diagram illustrating bitstream generation performed by a bitstream generation unit illustrated in FIG. 3A.

FIG. 6 is a diagram illustrating bitstream generation performed by the bitstream generation unit 340 illustrated in FIG. 3A.

In FIG. 6(a) illustrates an existing JBIG bitstream format including a header region 612 and a compressed bitstream region 614.

In FIG. 6(b) illustrates a modified JBIG bitstream format in which a second header region 612 including compressed template information is added to a first header region 610.

In FIG. 6(c) illustrates another modified JBIG bitstream format in which the compressed bitstream region 620 is divided into a template bitstream region 622 and a halftone image bitstream region 624.

Figure 7:
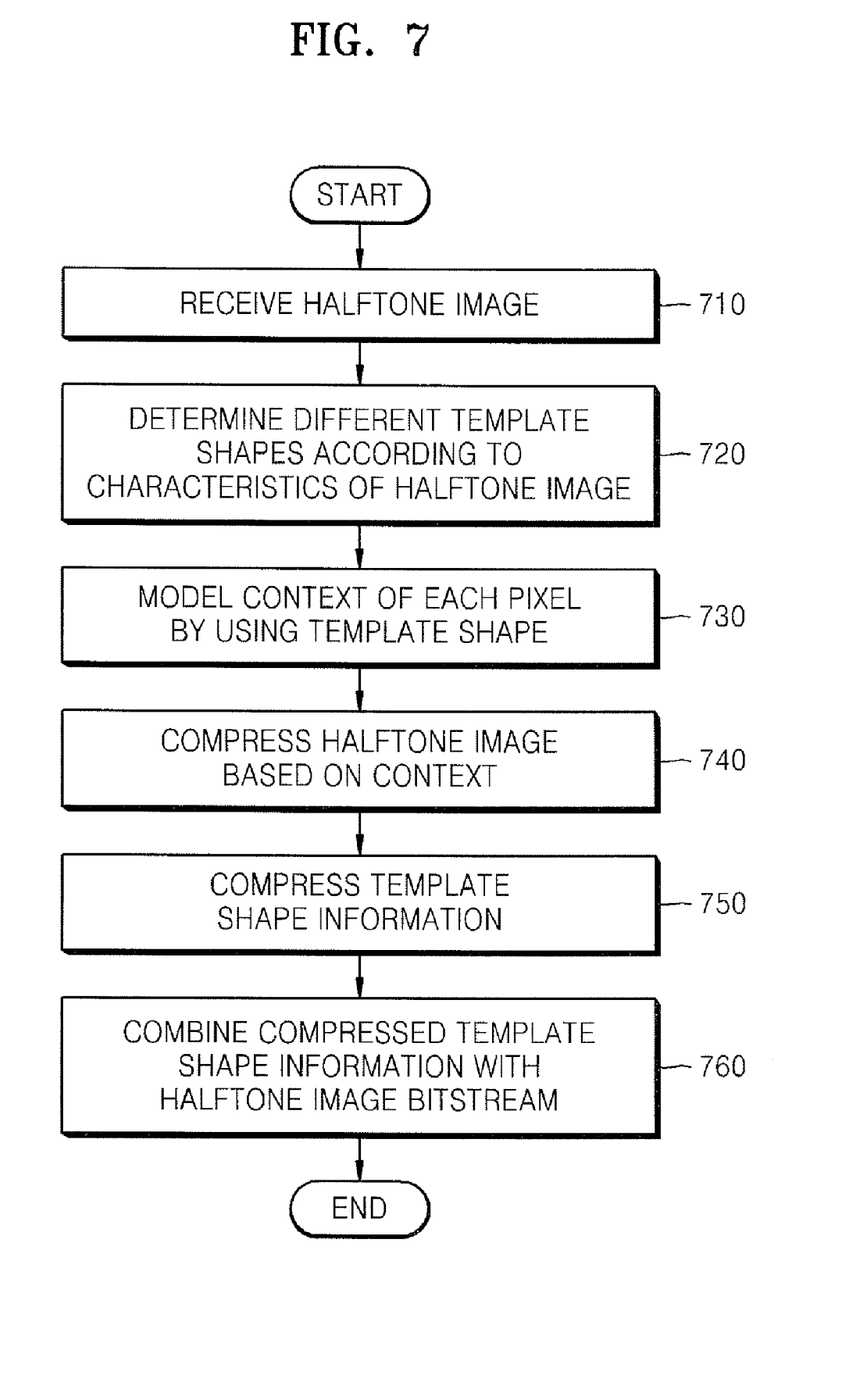
FIG. 7 is a flowchart illustrating a method of encoding a halftone image according to an embodiment of the present general inventive concept.

FIG. 7 is a flowchart illustrating a method of encoding a halftone image according to an embodiment of the present general inventive concept.

In operation 710, a halftone image having red/green/blue (RGB) channels or a halftone image having CMYK channels is input.

In operation 720, different template shapes are determined according to the characteristics of channels of the halftone image.

In operation 730, a context for pixels is modeled by using template shape information corresponding to an image of each channel.

In operation 740, the input halftone image is compressed based on the modeled context.

In operation 750, the template shape information is compressed.

In operation 760, the compressed template shape information is combined with a header of a compressed halftone image bitstream. According to another embodiment of the present general inventive concept, a compressed template shape information bitstream is combined with the compressed halftone image bitstream.

Finally, the halftone image bitstream is transmitted to an apparatus to decode a halftone image.

Figure 8:
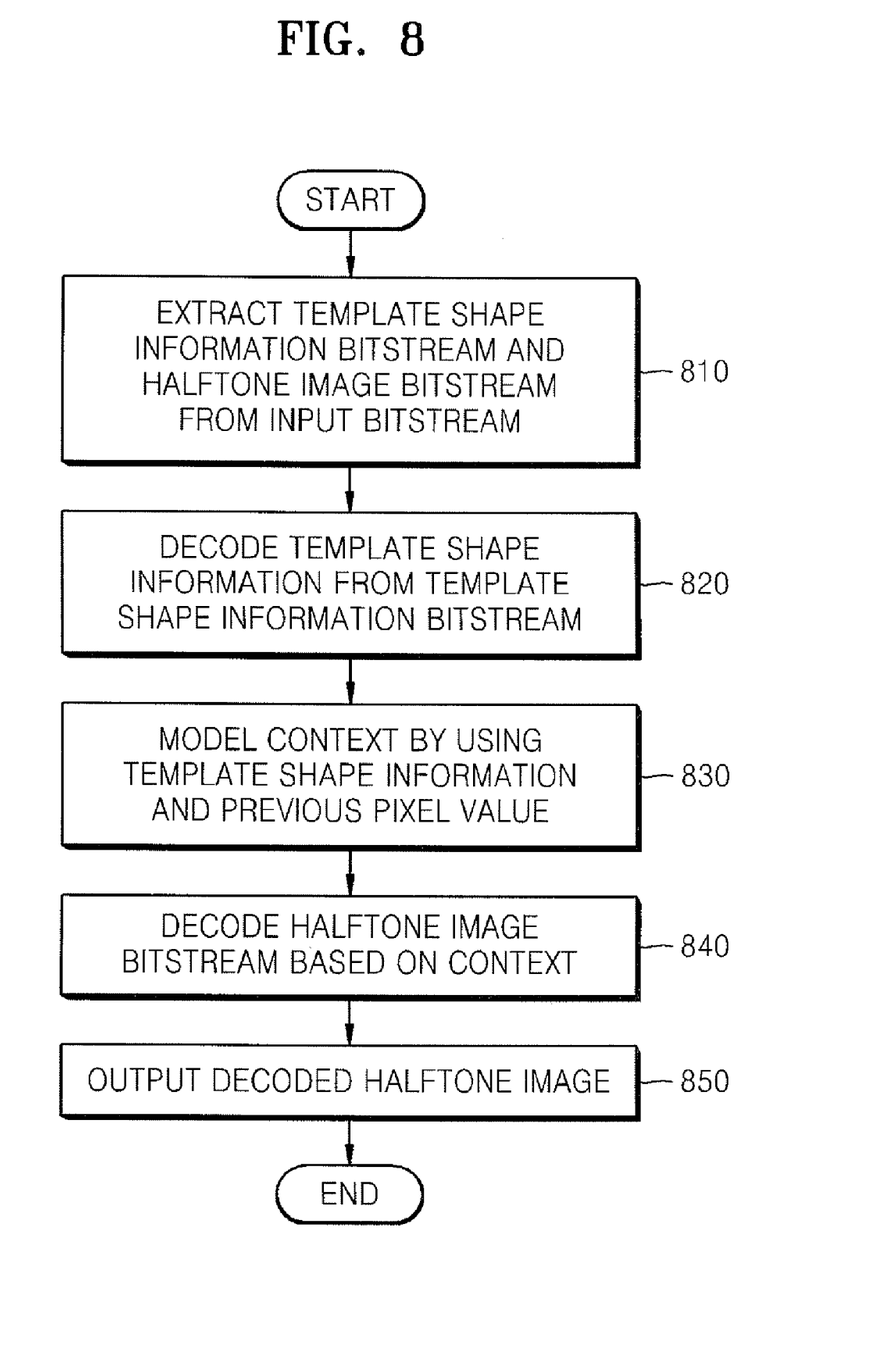
FIG. 8 is a flowchart illustrating a method of decoding a halftone image according to an embodiment of the present general inventive concept.

FIG. 8 is a flowchart illustrating a method of decoding a halftone image according to an embodiment of the present general inventive concept.

In operation 810, a halftone image bitstream and a template shape information bitstream are extracted from an input bitstream.

In operation 820, template shape information is decoded from the extracted template shape information bitstream.

In operation 830, a context for pixels is modeled by applying a previous pixel value to the decoded template shape information.

In operation 840, the halftone image bitstream is decoded based on the modeled context.

In operation 850, a decoded halftone image is output.

Figure 9:
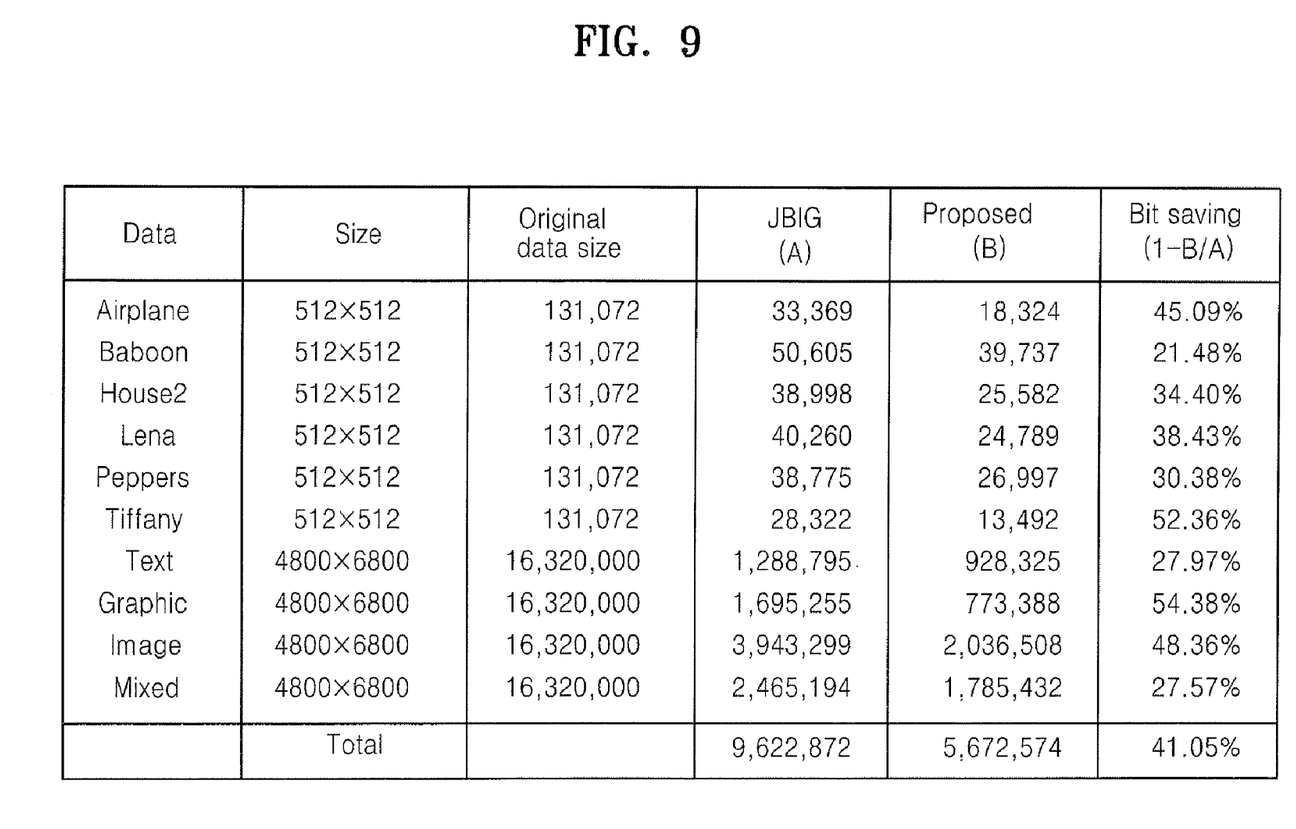
FIG. 9 is a table illustrating compression performance achieved by the method of encoding a halftone image according to an embodiment of the present general inventive concept.

FIG. 9 is a table illustrating compression performance achieved by the method of encoding a halftone image according to an embodiment of the present general inventive concept.

Referring to FIG. 9, a template shape varies according to a line pattern of an input image, thereby achieving a bit saving of 41.05% when compared to an existing JBIG codec.

Therefore, halftone encoding performance according to an embodiment of the present general inventive concept is superior to encoding performance of the existing JBIG.

As described above, according to various embodiments of the present general inventive concept, a halftone image is compressed based on a template that is adaptive to pattern characteristics of the halftone image, thereby compressing the halftone image more efficiently than the existing JBIG standard.

Furthermore, since the adaptive template according to various embodiments of the present general inventive concept varies with an input image pattern, compression performance according to the present general inventive concept is superior to compression performance according to the existing JBIG standard.

The present general inventive concept may be applied to various image output apparatuses which process a halftone image, such as a printer, a scanner, a facsimile, a multi-function printer (MFP), and the like.

The present general inventive concept can be embodied as a computer-readable code on a computer-readable recording medium. The computer-readable medium can include a computer-readable recording medium and a computer-readable transmission medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

While the present general inventive concept has been particularly illustrated and described with reference to embodiments thereof, it will be understood by one of ordinary skill in the art that various changes in form and detail may be made therein without departing from the spirit and scope of the present general inventive concept as defined by the following claims.

What is claimed is:

1. A method of encoding a halftone image, the method comprising:
   determining different template shapes according to characteristics of the halftone image;
   compressing the halftone image based on determined template shape information set differently according to a line pattern of an image of each color channel of the halftone image;
   compressing the template shape information; and
   generating the compressed halftone image and the compressed template shape information as a bitstream.

2. The method of claim 1, wherein the determining different template shapes comprises:
determining different template shapes that are previously set for color channels of the halftone image.

3. The method of claim 1, wherein the compressing of the halftone image comprises:
compressing the halftone image by using different template shapes for color channels of the halftone image.

4. The method of claim 1, wherein the template shape information is designed optimally for a line pattern of each channel of the halftone image and is stored in a memory.

5. The method of claim 1, wherein the compressing of the template shape information comprises:
determining the plurality of different template shapes according to the characteristics of the halftone image;
generating a coding symbol by decomposing a determined template shape; and
converting the coding symbol into bits.

6. The method of claim 1, wherein the compressed template shape information is included in a header of the bitstream.

7. The method of claim 1, wherein the compressed template shape information is combined with a halftone image bitstream.

8. The method of claim 1, wherein the template shape information includes a number of pixels constituting a determined template shape and position information of each of the pixels.

9. A method of decoding a halftone image, the method comprising:
splitting a bitstream into a halftone image bitstream and a template bitstream;
decoding template shape information generated according to characteristics of the halftone image from the template bitstream, the template shape information being set differently according to a line pattern of an image of each color channel of the halftone image; and
decoding the halftone image based on the decoded template shape information.

10. The method of claim 9, wherein the decoding of the template shape information comprises:
extracting relative position information between pixels constituting a determined template shape.

11. The method of claim 9, wherein the decoding of the halftone image comprises:
decoding the halftone image for each of color channels of the halftone image based on different templates for each of color channels.

12. A halftone image coding-decoding (CODEC) method, comprising:
determining different template shapes according to characteristics of a halftone image and compressing determined template shape information set differently according to a line pattern of an image of each color channel of the halftone image;
compressing the halftone image based on a determined template shape;
generating the compressed halftone image and the compressed template shape information as a bitstream;
extracting a halftone image bitstream and a template bitstream from the bitstream;
decoding the template shape information from the extracted template bitstream; and
decoding the compressed halftone image based on the decoded template shape information.

13. An apparatus to encode a halftone image, the apparatus comprising:
a template information encoding unit to determine different template shapes according to characteristics of the halftone image and to compress determined template shape information set differently according to a line pattern of an image of each color channel of the halftone image;
a first context modeling unit to extract a context for pixels of the halftone image based on the template shape information determined by the template information encoding unit;
an arithmetic encoding unit to compress the halftone image based on the context extracted by the first context modeling unit; and
a bitstream generation unit to generate the template shape information compressed by the template information encoding unit and the halftone image compressed by the arithmetic encoding unit as a bitstream.

14. The apparatus of claim 13, wherein the template information encoding unit comprises:
a template modeling unit to determine different template shapes according to the characteristics of the halftone image;
a template decomposition unit to extract relative position information between pixels constituting a template shape determined by the template modeling unit; and
a template bit generation unit to convert the relative position information between pixels extracted by the template decomposition unit into bits.

15. An apparatus to decode a halftone image, the apparatus comprising:
a bitstream splitting unit to split a bitstream into a halftone image bitstream and a template bitstream;
a template information decoding unit to decode template shape information generated according to characteristics of the halftone image from the template bitstream obtained by the bitstream splitting unit, the template shape information being set differently according to a line pattern of an image of each color channel of the halftone image;
a second context modeling unit to extract a context for pixels of the halftone image based on the template shape information decoded by the template information decoding unit and previous pixel information; and
an arithmetic decoding unit to decode the halftone image based on the context extracted by the second context modeling unit.

16. The apparatus of claim 15, wherein the template information decoding unit comprises:
a template bit decoding unit to decode partial template symbols from the template bitstream; and
decoding the template shape information by recombining the partial template symbols decoded by the template bit decoding unit.

17. A halftone image encoder apparatus, the apparatus comprising:
a template information encoding unit to determine different template shapes based on characteristics of a halftone image and to compress the halftone image based on the determined template shape information, set differently according to a line pattern of an image of each color channel of the halftone image.

18. A halftone image coding and decoding system, the system comprising:
- an encoding device configured to determine different template shapes corresponding to characteristics of a halftone image and to compress determined template shape information set differently according to a line pattern of an image of each color channel of the halftone image, to compress the halftone image based on the determined template shape, to generate the compressed halftone image and the compressed template shape information as a bitstream, and to output the bitstream; and
- a decoding device configured to receive the bitstream output from the encoding device, to extract a halftone image bitstream and a template bitstream from the received bitstream, to decode the template shape information from the extracted template bitstream, and to decode the compressed halftone image based on the decoded template shape information.

19. A method of encoding a halftone image, the method comprising:
- determining different template shapes based on characteristics of the halftone image; and
- compressing the halftone image based on determined template shape information set differently according to a line pattern of an image of each color channel of the halftone image.

20. A non-transitory computer-readable recording medium having embodied thereon a computer program to execute a method, wherein the method comprises:
- determining different template shapes determined based on characteristics of the halftone image; and
- compressing the halftone image based on determined template shape information set differently according to a line pattern of an image of each color channel of the halftone image.

* * * * *